(12) United States Patent
Kotecha et al.

(10) Patent No.: US 9,839,065 B2
(45) Date of Patent: *Dec. 5, 2017

(54) MANAGING RADIO RESOURCE CONTROL (RRC) CONNECTIONS BASED ON RADIO BEARER ATTRIBUTES

(71) Applicant: Verizon Patent and Licensing Inc., Arlington, VA (US)

(72) Inventors: Lalit R. Kotecha, San Ramon, CA (US); William H. Stone, Doylestown, PA (US); Lee K. Tjio, Danville, CA (US); Raymond So, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/476,145

(22) Filed: Mar. 31, 2017

(65) Prior Publication Data

US 2017/0208647 A1 Jul. 20, 2017

Related U.S. Application Data

(63) Continuation of application No. 14/193,268, filed on Feb. 28, 2014, now Pat. No. 9,648,658.

(51) Int. Cl.
*H04W 76/04* (2009.01)
*H04W 72/10* (2009.01)
*H04W 76/06* (2009.01)

(52) U.S. Cl.
CPC ......... *H04W 76/046* (2013.01); *H04W 72/10* (2013.01); *H04W 76/064* (2013.01)

(58) Field of Classification Search
CPC .................. H04W 76/046; H04W 76/064
(Continued)

(56) References Cited

U.S. PATENT DOCUMENTS

| 9,420,589 B2 * | 8/2016 | Basu-Mallick ... H04W 28/0289 |
| 2006/0052103 A1 * | 3/2006 | Mikoshiba ............ H04W 72/10 455/435.3 |
| 2015/0173107 A1 * | 6/2015 | Newberg ............ H04W 76/005 455/416 |

OTHER PUBLICATIONS

Ixia, "Quality of Service (QoS) and Policy Management in Mobile Data Networks: Validating Service Quality to Ensure Subscriber Quality of Experience (QoE)", http://www.ixiacom.com/pdfs/library/white_papers/policy_management.pdf, Dec. 2013, 22 pages.
(Continued)

*Primary Examiner* — John J Lee

(57) ABSTRACT

A base station may establish a radio resource control (RRC) connection with a first user device. The base station may determine a bearer attribute of a bearer associated with the RRC connection and the first user device. The base station may determine that the bearer attribute satisfies a set of conditions, and may analyze multiple bearer attributes associated with multiple established RRC connections. The base station may select a terminable RRC connection, of the multiple established RRC connections, based on analyzing the multiple bearer attributes. The terminable RRC connection may be associated with a second user device that is different from the first user device, and the terminable RRC connection may be different from the RRC connection. The device may terminate the terminable RRC connection based on selecting the terminable RRC connection.

20 Claims, 9 Drawing Sheets

(58) Field of Classification Search
USPC .................. 455/561, 456.1, 509, 512, 452.1
See application file for complete search history.

(56) References Cited

OTHER PUBLICATIONS

Wikipedia, "Radio Resource Control", http://en.wikipedia.org/wiki/Radio_Resource_Control, Feb. 25, 2014, 2 pages.
Anvesha Yash, "Notes-Express: What is a Radio Bearer in UMTS?" http://notes-express.blogspot.com/2010/08/what-is-radio-bearer-in-umts.html, Aug. 10, 2010, 2 pages.

* cited by examiner

MANAGING RADIO RESOURCE CONTROL (RRC) CONNECTIONS BASED ON RADIO BEARER ATTRIBUTES

RELATED APPLICATION

This application is a continuation of U.S. patent application Ser. No. 14/193,268, filed Feb. 28, 2014, which is incorporated herein by reference.

BACKGROUND

The radio resource control (RRC) protocol may handle control plane signaling between a user device and a base station (e.g., an access point to a cellular network). For example, the RRC protocol may manage connection establishment and release between a user device and a base station. There may only be a single RRC connection between a particular user device and a particular base station at any one time. The RRC protocol may also handle the establishment of radio bearers. A radio bearer may refer to a link between two end points (e.g., a user device and a server that provides a network service), and may be defined by a particular set of characteristics (e.g., end point identifiers, port identifiers, a protocol type, a quality of service characteristic, etc.). There may be multiple radio bearer connections between a particular user device and a particular base station at any one time.

DETAILED DESCRIPTION OF PREFERRED EMBODIMENTS

The following detailed description of example implementations refers to the accompanying drawings. The same reference numbers in different drawings may identify the same or similar elements.

A radio resource control (RRC) connection between a user device and a base station may be used to handle control plane signaling. There may only be a single RRC connection between a particular user device and a particular base station at any one time. On the other hand, there may be multiple radio bearer connections between a particular user device and a particular base station at any one time. A radio bearer (sometimes referred to herein as a bearer) may refer to a link between a user device and another device that acts as an end point, such as a server that provides a network service to the user device. Radio bearers may be associated with different priority levels, which may cause a base station to terminate a low priority bearer or prevent a low priority bearer from being established when a network, associated with the base station, becomes congested. However, terminating or preventing bearer connections may not resolve congestion issues associated with a limit on the quantity of RRC connections permitted by the base station. Implementations described herein intelligently manage RRC connections based on bearer attributes, so as to manage network congestion while still honoring bearer priority levels.

Figure 1:
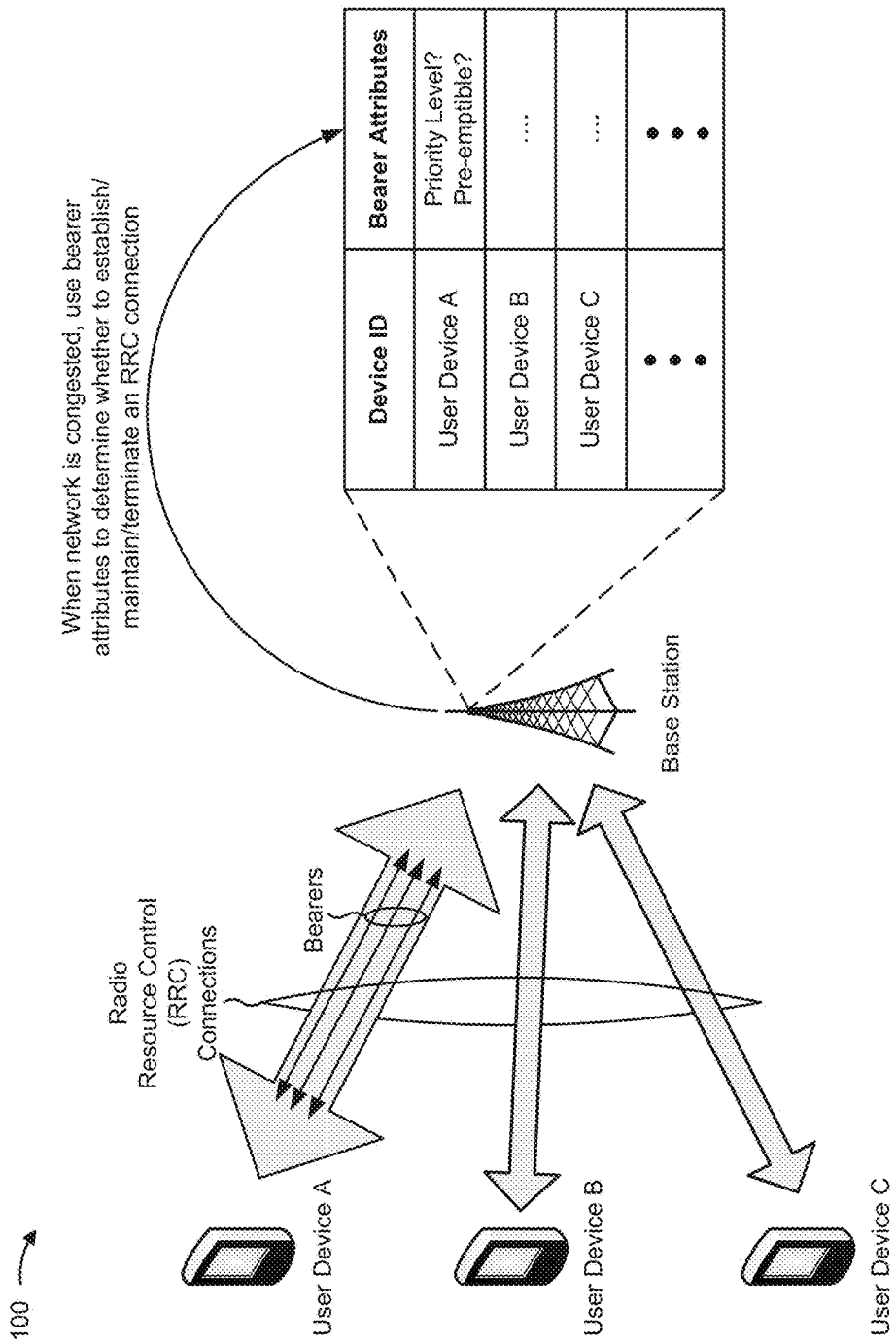
FIG. 1 is a diagram of an overview of an example implementation described herein.

FIG. 1 is a diagram of an overview of an example implementation 100 described herein. As shown in FIG. 1, a base station may establish RRC connections with multiple user devices, shown as User Device A, User Device B, and User Device C. A single RRC connection may be established between the base station and any one particular user device. As further shown, each RRC connection may manage multiple bearers that link a user device to another end point via the base station. For example, User Device A is shown as being associated with three bearers managed via the RRC connection with the base station.

As further shown in FIG. 1, when the network is congested, the base station may use attributes of the bearers to determine whether to establish, maintain, and/or terminate an RRC connection with a user device (e.g., a user device already connected to the base station via an RRC connection and/or a user device requesting an RRC connection to the base station). For example, the base station may analyze attributes of one or more bearers, associated with a user device, to determine a priority level of the one or more bearers, to determine whether the one or more bearers are pre-emptible, etc. The base station may determine whether to establish, maintain, or terminate an RRC connection with the user device based on the bearer attributes. In this way, the base station may honor bearer priority levels during periods of network congestion when the base station must terminate an RRC connection (e.g., due to a limit on the number of supported RRC connections).

Figure 2:
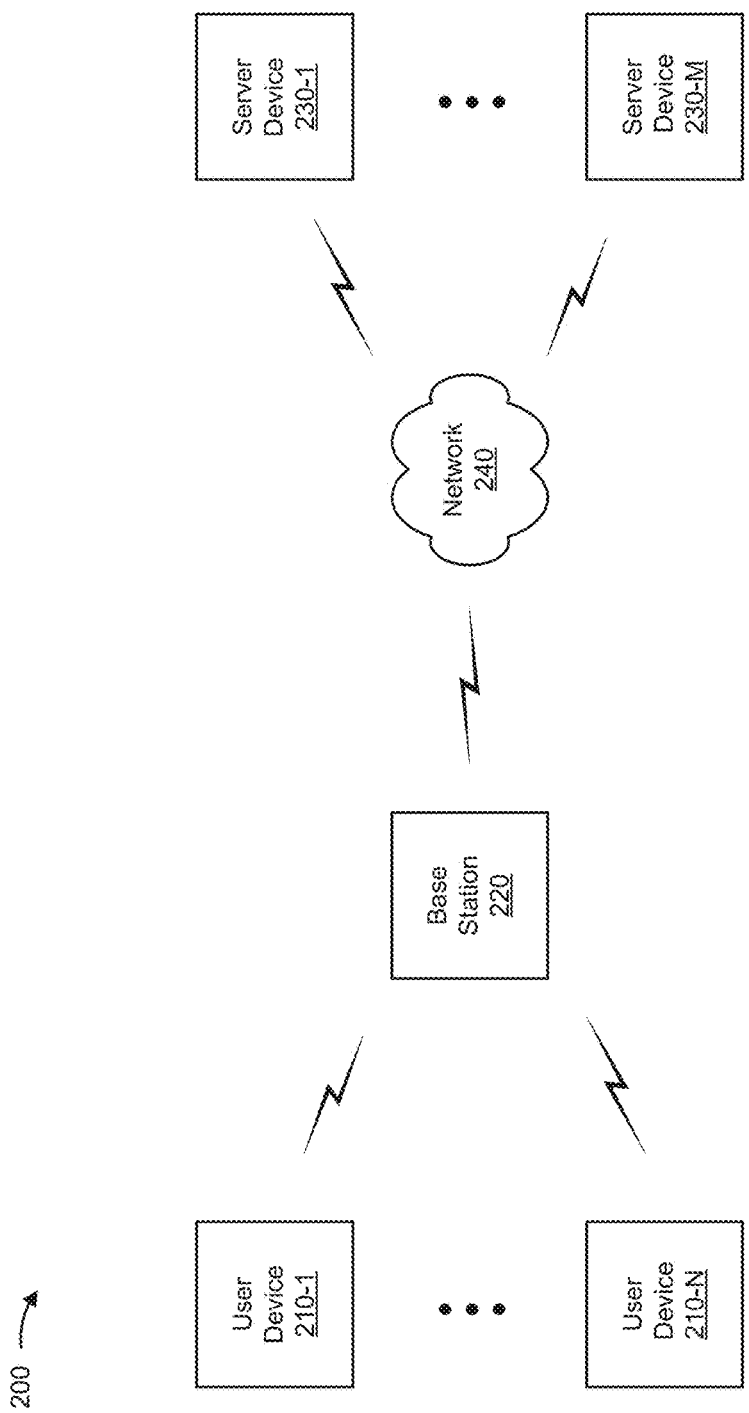
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include one or more user devices 210-1 through 210-N (N≥1) (hereinafter referred to collectively as "user devices 210," and individually as "user device 210"), a base station 220, one or more server devices 230-1 through 230-M (M≥1) (hereinafter referred to collectively as "server devices 230," and individually as "server device 230"), and a network 240. Devices of environment 200 may interconnect via wired connections, wireless connections, or a combination of wired and wireless connections.

User device 210 may include one or more devices capable of receiving, generating, processing, storing, and/or providing information via a radio bearer that carries information via an RRC connection with base station 220. For example, user device 210 may include a mobile phone (e.g., a smart phone), a mobile station, a radiotelephone, a video phone, a personal communications systems (PCS) terminal (e.g., that may combine a cellular radiotelephone with data processing and data communications capabilities), a personal digital assistant (PDA) (e.g., that may include a radiotelephone, a pager, Internet/intranet access, etc.), a computer (e.g., a desktop computer, a laptop computer, a tablet computer, etc.), a video game console, a set-top box, or a similar type of device capable of communicating with base station 220. User device 210 may establish a single RRC connection with base station 220, and may establish multiple bearer connections with one or more end point devices (e.g., server devices 230) via the RRC connection.

Base station 220 may include one or more devices capable of receiving, generating, processing, storing, and/or providing network traffic, such as media, audio, video, text, and/or other traffic, destined for and/or received from one or more devices shown in FIG. 2. In some implementations, base station 220 may include an eNodeB associated with a long term evolution (LTE) network that receives traffic from and/or sends traffic over network 240 via a packet data network gateway and/or a serving gateway. Additionally, or alternatively, base station 220 may be associated with a radio access network other than an LTE network. Base station 220 may send traffic to and/or receive traffic from user device 210 via an air interface. Base station 220 may establish a single RRC connection with a particular user device 210, and may provide multiple bearer connections, between user device 210 and one or more end point devices (e.g., server devices 230), via the RRC connection.

Server device 230 may include one or more devices capable of receiving and/or providing information over a network (e.g., network 240), and/or capable of generating, storing, and/or processing information received and/or provided over the network. For example, server device 230 may include a computing device, such as a server (e.g., an application server, a content server, a host server, a web server, etc.) or a similar device. Server device 230 may receive information from and/or provide information to user device 210 (e.g., via network 240 and/or base station 220). A connection between server device 230 and user device 210 may be provided via a bearer that identifies characteristics of the connection, such as a first end point (e.g., server device 230), a second end point (e.g., user device 210), a connection protocol, a priority level associated with the connection, etc.

Network 240 may include one or more wired and/or wireless networks. For example, network 240 may include a cellular network (e.g., a long term evolution (LTE) network, a code division multiple access (CDMA) network, etc.), a public land mobile network (PLMN), a local area network (LAN), a wireless local area network (WLAN) (e.g., a Wi-Fi network), a wide area network (WAN), a metropolitan area network (MAN), a telephone network (e.g., the Public Switched Telephone Network (PSTN)), a near field communication (NFC) network, a Bluetooth network, an ad hoc network, an intranet, the Internet, a fiber optic-based network, a cloud computing network, and/or a combination of these or other types of networks.

The number of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
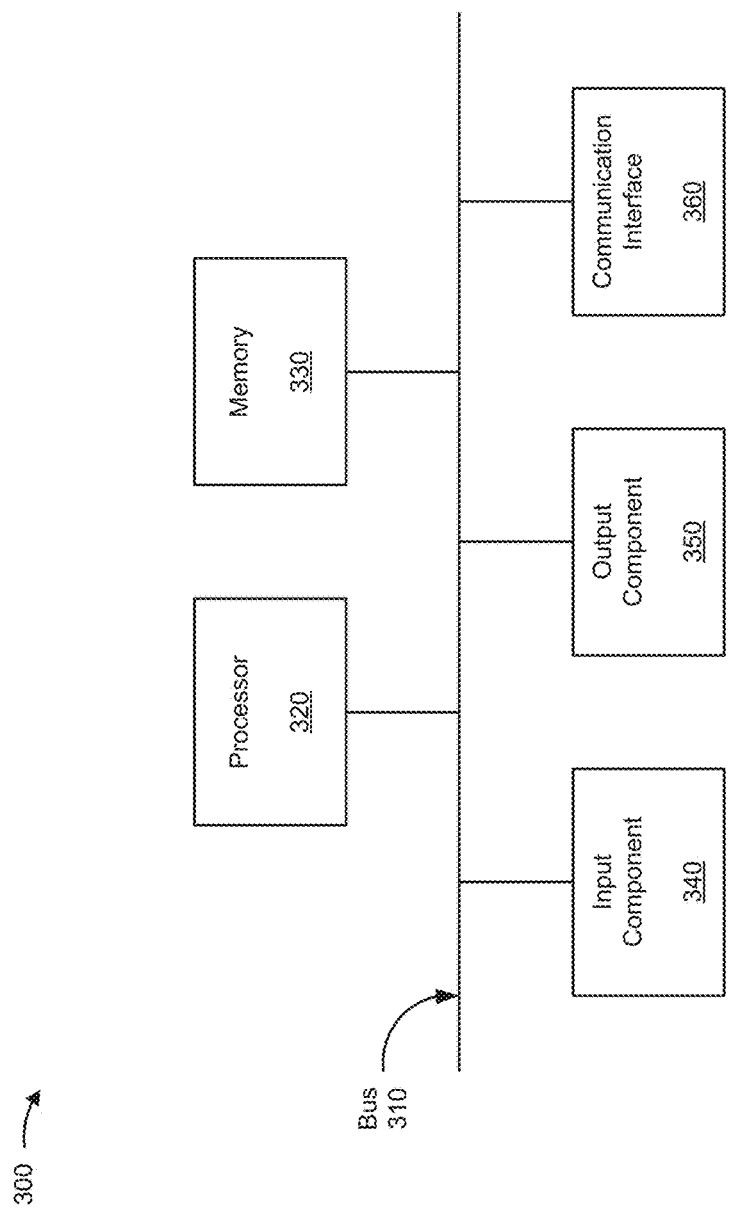
FIG. 3 is a diagram of example components of one or more devices of FIG. 2.

FIG. 3 is a diagram of example components of a device 300. Device 300 may correspond to user device 210, base station 220, and/or server device 230. In some implementations, each of user device 210, base station 220, and/or server device 230 may include one or more devices 300 and/or one or more components of device 300. As shown in FIG. 3, device 300 may include a bus 310, a processor 320, a memory 330, an input component 340, an output component 350, and a communication interface 360.

Bus 310 may include a component that permits communication among the components of device 300. Processor 320 may include a processor (e.g., a central processing unit, a graphics processing unit, an accelerated processing unit), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Output component 350 may include a component that outputs information from device 300 (e.g., a display, a speaker, one or more light-emitting diodes (LEDs), etc.).

Communication interface 360 may include a transceiver-like component, such as a transceiver and/or a separate receiver and transmitter, that enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions included in a computer-readable medium, such as memory 330. A computer-readable medium is defined herein as a non-transitory memory device. A memory device includes memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3.

Figure 4:
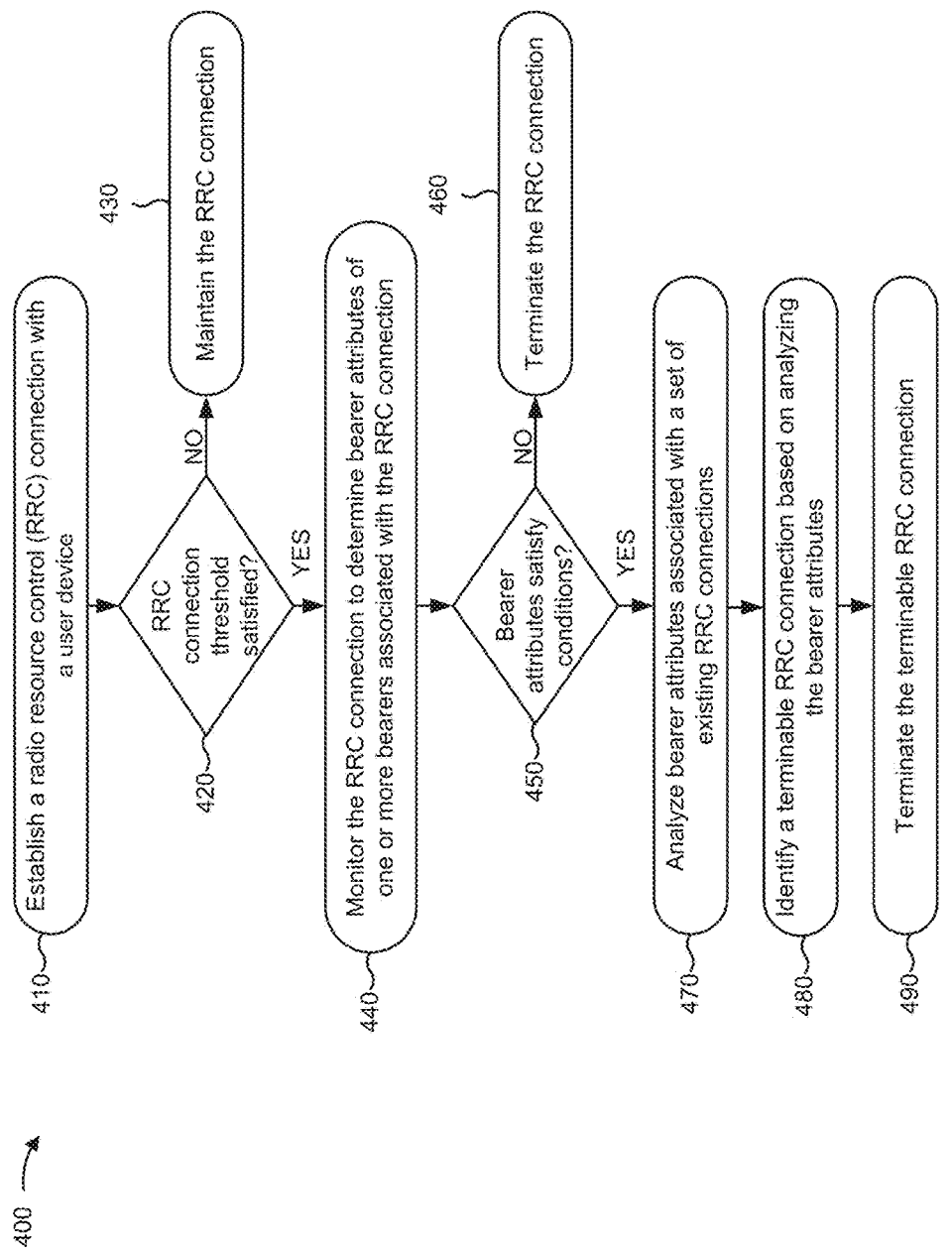
FIG. 4 is a flow chart of an example process for managing radio resource control connections based on radio bearer attributes.

FIG. 4 is a flow chart of an example process 400 for managing radio resource control connections based on radio bearer attributes. In some implementations, one or more process blocks of FIG. 4 may be performed by base station 220. Additionally, or alternatively, one or more process blocks of FIG. 4 may be performed by another device or a group of devices separate from or including base station 220, such as user device 210 and/or server device 230.

As shown in FIG. 4, process 400 may include establishing a radio resource control (RRC) connection with a user device (block 410), and determining whether an RRC connection threshold is satisfied (block 420). For example, base station 220 may establish an RRC connection with user device 210. User device 210 may transmit a radio signal (e.g., via a cellular modem), and base station 220 may receive the radio signal. Base station 220 may perform various processing based on information included in the radio signal, or may provide information included in the radio signal to another device (e.g., a home subscriber server, an authentication server, an authorization server, an accounting server, a mobility management entity, etc.) for processing. The processing may include, for example, authenticating user device 210, performing hand-off operations associated with user device 210 (e.g., when user device 210 changes location from a first cell site, associated with a first base station 220, to a second cell site, associated with a second base station 220), etc. Base station 220 may establish an RRC connection with user device 210 based on the processing (e.g., based on authenticating user device 210).

Base station 220 may determine whether an RRC connection threshold is satisfied. For example, base station 220 may determine a quantity of existing RRC connections (e.g., RRC connections that have been established), and may determine whether the quantity of existing RRC connections satisfies a threshold (e.g., is greater than a threshold, is greater than or equal to a threshold, etc.). In other words, base station 220 may determine a quantity of user devices 210 that have established a connection with base station 220, and may compare that quantity to a threshold value to determine whether the RRC connection threshold is satisfied.

Base station 220 may store a counter value that represents a quantity of existing RRC connections, in some implementations. Base station 220 may detect when a new RRC connection has been established (e.g., when user device 210 enters a service area of base station 220), and may increment the counter value based on detecting the new RRC connection. Conversely, base station 220 may detect when an existing RRC connection has been terminated (e.g., when user device 210 exits a service area of base station 220), and may decrement the counter value based on detecting that the existing RRC connection has been terminated.

In some implementations, base station 220 may establish a new bearer on an existing RRC connection (e.g., with a user device 210 that is already connected to base station 220 via the existing RRC connection). In this case, base station 220 may not increment the counter value because the quantity of RRC connections has not changed (e.g., the new bearer has been added to an existing RRC connection).

As further shown in FIG. 4, if the RRC connection threshold is not satisfied (block 420—NO), then process 400 may include maintaining the RRC connection (block 430). For example, base station 220 may establish an RRC connection, may determine a quantity of established RRC connections, and may determine that the quantity does not satisfy an RRC connection threshold (e.g., is less than the RRC connection threshold, is less than or equal to the RRC connection threshold, etc.). In this case, base station 220 may maintain the established RRC connection. In other words, when base station 220 is not congested (e.g., as indicated by the RRC connection threshold), base station 220 may permit new RRC connections to be established without terminating any existing RRC connections.

As further shown in FIG. 4, if the RRC connection threshold is satisfied (block 420—YES), then process 400 may include monitoring the RRC connection to determine bearer attributes of one or more bearers associated with the RRC connection (block 440). For example, base station 220 may establish an RRC connection, may determine a quantity of established RRC connections, and may determine that the quantity satisfies the RRC connection threshold (e.g., is greater than the RRC connection threshold, is greater than or equal to the RRC connection threshold, etc.). In this case, base station 220 may monitor the established RRC connection to determine bearer attributes of one or more bearers associated with the RRC connection (e.g., one or more bearers associated with user device 210 connected to base station 220 via the RRC connection).

In some implementations, base station 220 may wait a particular amount of time (e.g., a threshold amount), and may determine the bearer attributes after the particular amount of time has elapsed. Additionally, or alternatively, base station 220 may detect that a threshold quantity of bearers (e.g., one bearer), associated with the RRC connection, has been established, and may determine the bearer attributes based on detecting that the threshold quantity of bearers has been established. In this way, base station 220 may permit user device 210 to establish one or more bearers (e.g., with one or more server devices 230) before analyzing the bearers to determine whether to terminate an RRC connection with user device 210. Base station 220 may determine a bearer attribute based on an identifier associated with the bearer and/or carried in a packet associated with the bearer.

A bearer attribute may include, for example, a priority level assigned to a bearer. The priority level may indicate, for example, whether the bearer is associated with a real-time communication (e.g., a real-time voice call, a real-time video call, etc.), a non-real-time communication (e.g., browsing the web), a guaranteed bitrate communication, a non-guaranteed bitrate communication, a pre-emptible communication, a non-pre-emptible communication, etc. Additionally, or alternatively, a bearer may be marked as a real-time bearer, a non-real-time bearer, a pre-emptible bearer, a non-pre-emptible bearer, a high priority bearer, a low priority bearer, etc.

The priority level may be indicated by a priority level identifier included in a packet carried via the bearer, in some implementations. The priority level identifier may include, for example, a quality of service (QoS) class indicator (QCI) value. A QCI value may be used to identify characteristics of a packet and/or a bearer that carries the packet, such as a type of communication associated with the packet and/or the bearer (e.g., conversational voice, conversational video, real-time gaming, streaming video, Internet protocol multimedia subsystem signaling, streaming video, web, e-mail, etc.), a priority level of the packet and/or the bearer (e.g., a relative priority compared to other packets and/or bearers associated with different QCI classes), whether the packet and/or the bearer is associated with a guaranteed bit rate service or a non-guaranteed bit rate service, a permissible transmission delay associated with the packet and/or the bearer, a permissible packet error loss rate associated with the packet and/or the bearer, etc.

A QCI value may include a value of 1 through 9, with QCI values 1 through 4 identifying guaranteed bit rate services, and QCI values 5 through 9 identifying non-guaranteed bit rate services. QCI 1 may identify packets associated with conversational voice communications. QCI 2 may identify packets associated with conversational video communications. QCI 3 may identify packets associated with real-time gaming communications. QCI 4 may identify packets associated with streaming video communications. QCI 5 may identify packets associated with IMS signaling communications. QCIs 6, 8, and 9 may identify packets associated with streaming video, web, and/or e-mail communications. QCI 7 may identify packets associated with voice, video, and/or gaming communications. In some implementations, QCI classes may have a priority order of QCI 5, QCI 1, QCI 3, QCI 2, QCI 4, QCI 6, QCI 7, QCI 8, and QCI 9, with QCI 5 having the highest priority and QCI 9 having the lowest priority. In some implementations, base station 220 may use fewer, additional, different, or differently defined QCI classes and/or priority levels.

Additionally, or alternatively, a bearer attribute may include information that identifies an end point associated with the bearer. Base station 220 may determine the end point based on an end point identifier (e.g., a source identifier, a destination identifier, etc.) included in a packet associated with the bearer. Additionally, or alternatively, a bearer attribute may include a protocol type associated with the bearer (e.g., transmission control protocol (TCP), user datagram protocol (UDP), etc.). Base station 220 may determine the protocol type based on a protocol identifier included in a packet associated with the bearer.

As further shown in FIG. 4, process 400 may include determining whether one or more bearer attributes satisfy a set of conditions (block 450). For example, base station 220 may receive and/or store information that identifies a set of conditions for managing RRC connections, and may determine whether one or more bearer attributes, of the established RRC connection, satisfy the conditions. Base station 220 may analyze one or more bearer attributes to determine whether the one or more bearer attributes satisfy one or more conditions.

In some implementations, base station 220 may calculate a priority score based on one or more bearer attributes, and may compare the priority score to a threshold to determine whether the bearer attribute(s) satisfy the set of conditions. Base station 220 may assign a weight to one or more bearer attributes using a same weight value or different weight values, and may use the assigned weight(s) to calculate the priority score.

As further shown in FIG. 4, if the bearer attribute(s) do not satisfy the set of conditions (block 450—NO), then process 400 may include terminating the RRC connection (block 460). For example, base station 220 may determine that a bearer has been established for the established RRC connection. Base station 220 may analyze a bearer attribute of the bearer, and may determine whether the bearer attribute satisfies a condition. If the bearer attribute does not satisfy the condition, then base station 220 may terminate the RRC connection (and may tear down the bearer).

As an example, base station 220 may determine that the bearer is a low priority bearer. Base station 220 may determine that the bearer is a low priority bearer by, for example, determining that the bearer is associated with a non-real-time communication (e.g., is not associated with a real time communication), is associated with a non-guaranteed bitrate communication (e.g., is not associated with a guaranteed bitrate communication), is associated with a pre-emptible communication (e.g., is not associated with a non-pre-emptible communication), is associated with a low priority level (e.g., a priority level below a threshold, a particular QCI class value that indicates a low priority level, etc.), is associated with a low priority score, or the like. As an example, base station 220 may determine that a bearer is a low priority bearer when the bearer does not carry a real-time voice call or a real-time video call.

Base station 220 may determine that a bearer is a low priority bearer by determining that one of the above conditions is satisfied, or by determining that a combination of the above conditions is satisfied. For example, base station 220 may determine that a bearer is a low priority bearer when the bearer is associated with a particular QCI class value. As another example, base station 220 may determine that a bearer is a low priority bearer when the bearer is associated with a non-real-time communication and is associated with a non-guaranteed bitrate communication. When one or more of the above conditions is satisfied, base station 220 may terminate the RRC connection (e.g., because the RRC connection is associated with a low priority bearer). Base station 220 may terminate the RRC connection by preventing information from being provided to and/or received from user device 210 associated with the terminated RRC connection.

In some implementations, the RRC connection may be associated with multiple bearers. In this case, base station 220 may determine a priority level for a set of the bearers (e.g., all of the bearers or a subset of all of the bearers). Base station 220 may terminate the RRC connection if the set of bearers, associated with the RRC connection, are low priority bearers. As another example, base station 220 may set a priority level for the RRC connection using the highest priority bearer associated with the RRC connection, and may determine whether to terminate the RRC connection based on the set priority level (e.g., whether the highest priority bearer is a low priority bearer). Additionally, or alternatively, base station 220 may calculate an average priority level (e.g., a mean priority level, a median priority level, a weighted average priority level, etc.) using the priority levels determined for each bearer. Base station 220 may terminate the RRC connection if the average priority level satisfies a threshold (e.g., is below a threshold value).

As further shown in FIG. 4, if the bearer attribute(s) satisfy the set of conditions (block 450—YES), then process 400 may include analyzing bearer attributes associated with a set of existing RRC connections (block 470). For example, base station 220 may determine that a bearer has been established for a first RRC connection (e.g., as described above in connection with block 440). Base station 220 may analyze a bearer attribute of the bearer, and may determine whether the bearer attribute satisfies a condition. If the bearer attribute satisfies the condition, then base station 220 may maintain the first RRC connection (and may maintain the bearer), and may determine a second RRC connection to be terminated (e.g., a terminable RRC connection) based on bearer attributes of bearers associated with the second RRC connection.

As an example, base station 220 may determine that the bearer, associated with the first RRC connection, is a high priority bearer. Base station 220 may determine that the bearer is a high priority bearer by, for example, determining that the bearer is associated with a real-time communication (e.g., is not associated with a non-real time communication), is associated with a guaranteed bitrate communication (e.g., is not associated with a non-guaranteed bitrate communication), is associated with a non-pre-emptible communication (e.g., is not associated with a pre-emptible communication), is associated with a high priority level (e.g., a priority level above a threshold, a particular QCI class value that indicates a high priority level, etc.), is associated with a high priority score, or the like. For example, base station 220 may determine that a bearer is a high priority bearer when the bearer carries a real-time voice call, a real-time video call, or the like.

Base station 220 may determine that a bearer is a high priority bearer by determining that one of the above conditions is satisfied, or by determining that a combination of the above conditions is satisfied. For example, base station 220 may determine that a bearer is a high priority bearer when the bearer is associated with a particular QCI class value. As another example, base station 220 may determine that a bearer is a high priority bearer when the bearer is associated with a real-time communication and is associated with a guaranteed bitrate communication. When one or more of the above conditions is satisfied, base station 220 may maintain the first RRC connection (e.g., because the first RRC connection is associated with a high priority bearer). Because the RRC connection threshold is satisfied (e.g., there are too many RRC connections), base station 220 may determine a second RRC connection (e.g., that is different from the first RRC connection) to terminate.

In some implementations, an established RRC connection may be associated with multiple bearers. In this case, base station 220 may determine a priority level for a set of the bearers (e.g., all of the bearers or a subset of all of the bearers). Base station 220 may maintain the established RRC connection if at least one of the bearers, associated with the established RRC connection, is a high priority bearer. As another example, base station 220 may set a priority level for the established RRC connection using the highest priority bearer associated with the established RRC connection, and may determine whether to terminate the established RRC connection based on the set priority level (e.g., whether the highest priority bearer is a high priority bearer). Additionally, or alternatively, base station 220 may calculate an average priority level (e.g., a mean priority level, a median priority level, a weighted average priority level, etc.) using the priority levels determined for each bearer. Base station 220 may maintain the established RRC connection if the average priority level satisfies a threshold (e.g., is above a threshold value).

Base station 220 may determine the second RRC connection, to be terminated, by analyzing bearer attributes associated with a set of existing RRC connections. The set of existing RRC connections may include the first RRC connection, or may not include the first RRC connection. Base station 220 may analyze one or more bearer attributes, described elsewhere herein, to identify the second RRC connection to terminate (e.g., sometimes referred to herein as a terminable RRC connection).

As further shown in FIG. 4, process 400 may include identifying a terminable RRC connection based on analyzing the bearer attributes (block 480), and terminating the terminable RRC connection (block 490). For example, base station 220 may identify a terminable RRC connection (e.g., an existing RRC connection to be terminated) because a new RRC connection has been established and the RRC connection threshold has been satisfied. Base station 220 may compare attributes (e.g., bearer attributes) of existing RRC connections to identify the terminable RRC connection. Base station 220 may terminate the terminable RRC connection (e.g., by preventing information from being provided to and/or received from user device 210 associated with the terminated RRC connection).

In some implementations, base station 220 may identify a subset of existing RRC connections (e.g., fewer than all of the existing RRC connections) that are associated with low priority bearers (e.g., are not associated with any high priority bearers). For example, base station 220 may determine that all bearers, associated with a particular RRC connection, are low priority bearers. In this case, base station 220 may include the particular RRC connection in the subset of existing RRC connections associated with only low priority bearers. Base station 220 may analyze all RRC connections or a subset of RRC connections (e.g., a threshold quantity of RRC connections) to identify RRC connections to be included in the subset of existing RRC connections associated with only low priority bearers. This subset may be referred to herein as a set of low priority RRC connections.

Base station 220 may analyze the set of low priority RRC connections to determine the terminable RRC connection, so as not to terminate a high priority RRC connection (e.g., an RRC connection associated with at least one high priority bearer). In some implementations, base station 220 may determine a particular low priority RRC connection associated with a lower quantity (and/or the lowest quantity) of bearers as compared to other low priority RRC connections (e.g., included in the set of low priority RRC connections). Base station 220 may terminate the particular low priority RRC connection associated with the lower (e.g., lowest) quantity of bearers, so as to decrease disruption to users of user devices 210 connected to base station 220.

Additionally, or alternatively, base station 220 may determine a particular low priority RRC connection that has been connected to base station 220, and/or a network associated with base station 220, for a longer (and/or the longest) amount of time as compared to other low priority RRC connections. Base station 220 may terminate the particular low priority RRC connection that has been connected to base station 220 for a longer (e.g., longest) amount of time, so as to increase fairness to users of user devices 210 connected to base station 220. In some implementations (e.g., when user device 210 has been handed off to base station 220), base station 220 may receive (e.g., from a mobility management entity and/or another base station) information that identifies the amount of time that user device 210 has been connected to a network associated with base station 220 (e.g., has been connected to one or more base stations 220 associated with the network). In this way, base station 220 may manage network congestion in a fair manner, based on priority levels associated with bearers, when a network becomes congested.

Additionally, or alternatively, base station 220 may calculate priority scores for low priority RRC connections, and may determine a terminable RRC connection based on the priority scores. For example, base station 220 may determine to terminate a particular low priority RRC connection with the lowest priority score as compared to other low priority RRC connections. Base station 220 may calculate the priority score based on an average priority level (e.g., a mean priority level, a median priority level, a weighted average priority level, etc.) of bearers associated with an RRC connection, an average priority score of bearers associated with an RRC connection, or the like.

In some implementations, multiple low priority RRC connections may have the same quantity of low priority bearers. In this case, base station 220 may identify several low priority RRC connections as candidates for termination (e.g., several low priority RRC connections may carry one low priority bearer). Base station 220 may randomly select one of the candidate RRC connections for termination, in some implementations. Additionally, or alternatively, base station 220 may select a candidate RRC connection with the longest connection time for termination. Additionally, or alternatively, base station 220 may select a candidate RRC connection with the lowest priority score for termination (e.g., the candidate RRC connection associated with the lowest priority QCI class value).

In some implementations, every RRC connection with base station 220 may be associated with at least one high priority bearer. In this case, base station 220 may select a set of RRC connections associated with the fewest quantity of high priority bearers (e.g., one), as compared to all other RRC connections, and may use this set as the set of low priority RRC connections. Base station 220 may identify a terminable RRC connection from this set, as described in more detail above. In this way, base station 220 may intelligently manage RRC connections based on bearer attributes, so as to manage network congestion while still honoring bearer priority levels.

In some implementations, base station 220 may determine a particular RRC connection (e.g., a high priority RRC connection, a low priority RRC connection, etc.) that has the highest quantity of bearers (e.g., the highest quantity of high priority bearers, the highest quantity of low priority bearers, the highest quantity of overall bearers, etc.), and may terminate the particular RRC connection that has the highest quantity of bearers. In this way, base station 220 may reduce network congestion by not only terminating an RRC connection, but by tearing down more bearers than would be torn down if another RRC connection were to be terminated.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5E are diagrams of an example implementation 500 relating to example process 400 shown in FIG. 4. FIGS. 5A-5E show an example of managing RRC connections based on radio bearer attributes.

Figure 5A:
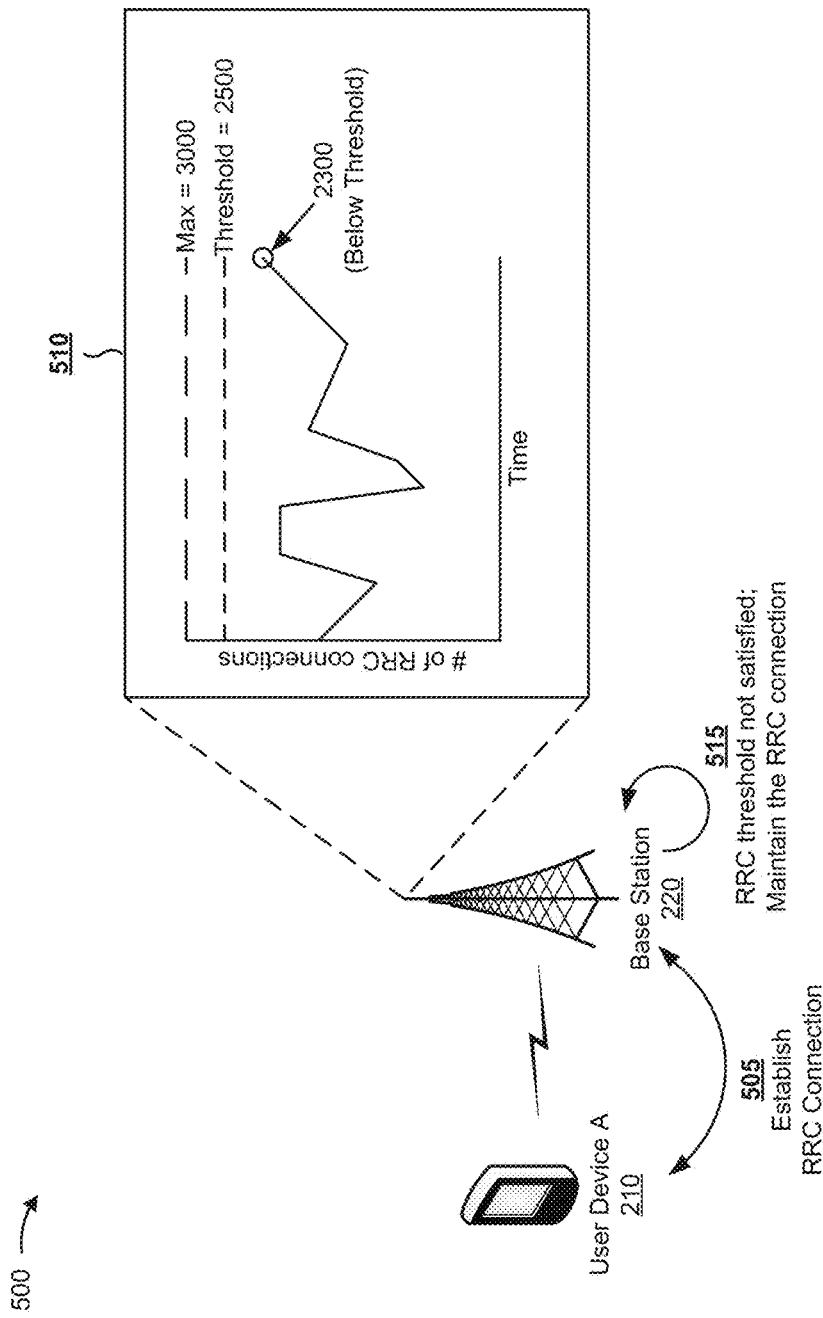
FIGS. 5A-5E are diagrams of an example implementation relating to the example process shown in FIG. 4.

As shown in FIG. 5A, and by reference number 505, assume that base station 220 establishes an RRC connection with a first user device 210, shown as User Device A. As shown by reference number 510, assume that base station 220 determines a quantity of existing RRC connections between base station 220 and user devices 210, and determines that the quantity is below a threshold value. As shown, assume that base station 220 can support a maximum quantity of 3000 RRC connections, and that base station 220 begins to apply the RRC connection management techniques described herein when the quantity of RRC connections is greater than or equal to 2500 RRC connections. Assume that base station 220 determines that there are currently 2300 existing RRC connections, which is below the threshold value of 2500 RRC connections. As shown by reference number 515, base station 220 determines that the RRC connection threshold is not satisfied, and maintains the established RRC connection with User Device A.

Figure 5B:
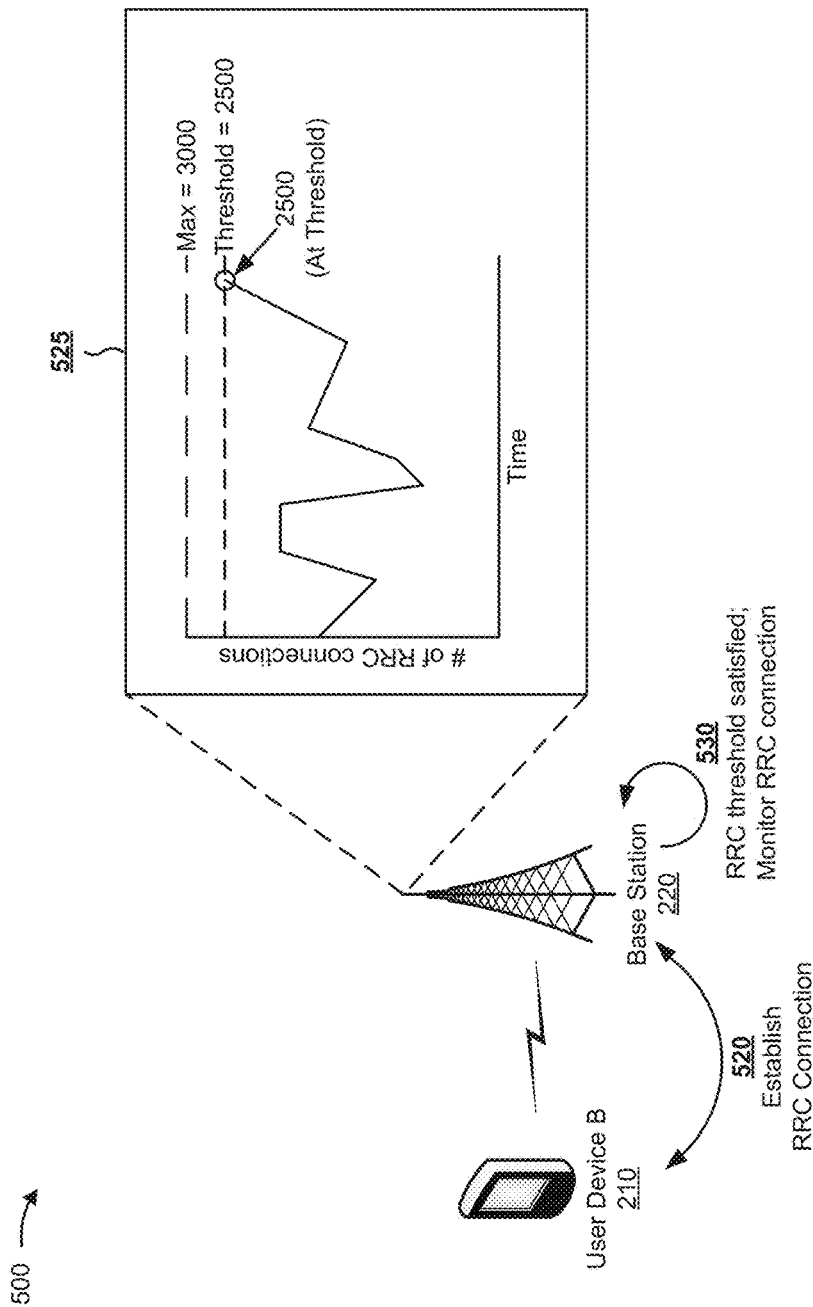

As shown in FIG. 5B, and by reference number 520, assume that at a later time, base station 220 establishes an RRC connection with a second user device 210, shown as User Device B. As shown by reference number 525, assume that base station 220 determines a quantity of existing RRC connections between base station 220 and user devices 210, and determines that the quantity is equal to a threshold value. For example, assume that the RRC connection established with User Device B is the $2500^{th}$ RRC connection, which satisfies the threshold value of 2500 RRC connections. As shown by reference number 530, base station 220 determines that the RRC connection threshold is satisfied, and monitors the established RRC connection with User Device B.

Figure 5C:
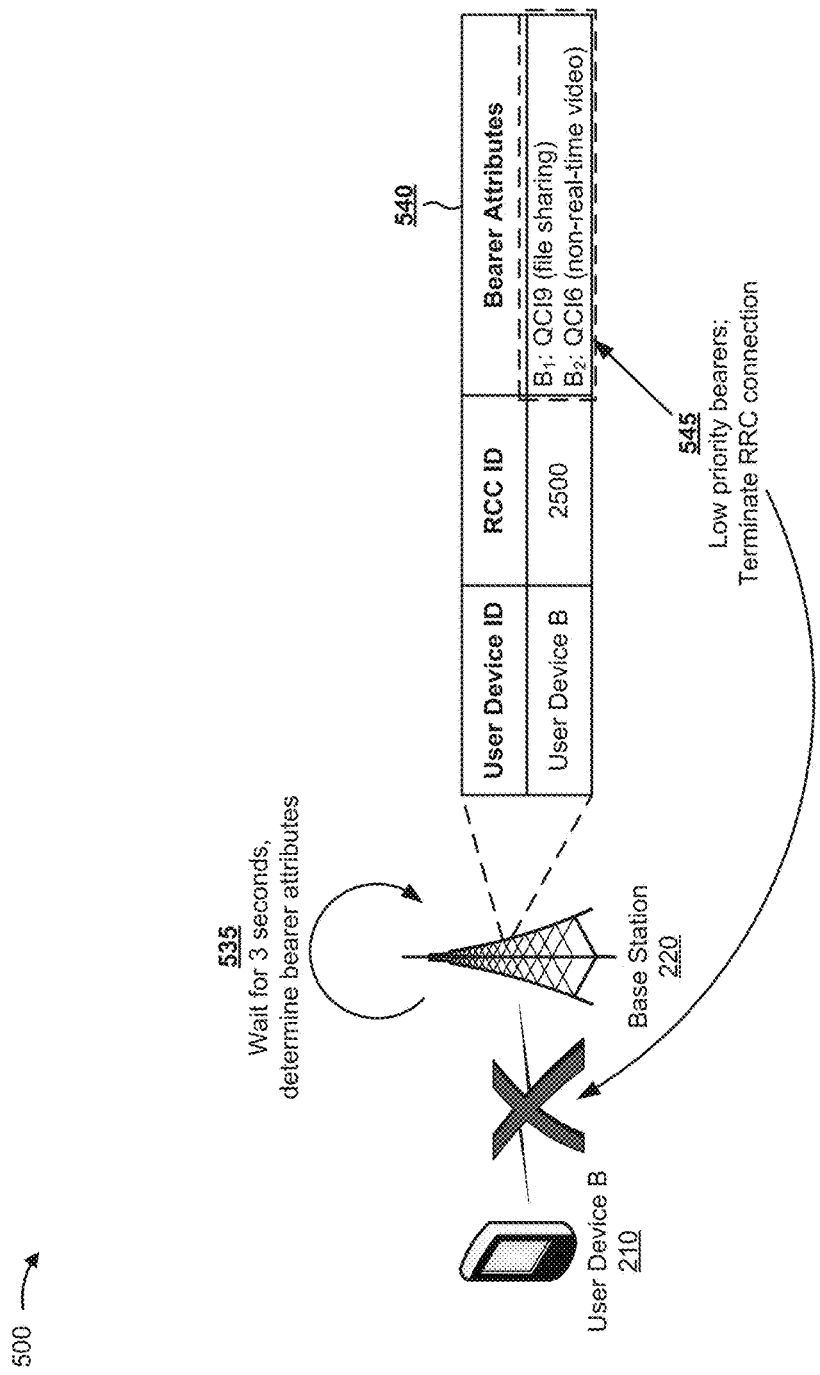

As shown in FIG. 5C, and by reference number 535, assume that base station 220 waits 3 seconds, after which time base station 220 determines bearer attributes associated with bearers established on the RRC connection with User Device B. As shown by reference number 540, assume that User Device B is associated with two bearers on the RRC connection. Assume that the first bearer ($B_1$) carries a file sharing communication with a QCI value of 9, and assume that the second bearer ($B_2$) carries a non-real-time video communication with a QCI value of 6. As shown by reference number 545, base station 220 determines that the two bearers are both low priority bearers (e.g., are both associated with non-real-time, non-guaranteed bitrate communications). Based on determining that all bearers associated with the RRC connection with User Device B are low priority bearers, base station 220 terminates the RRC connection with User Device B.

Figure 5D:
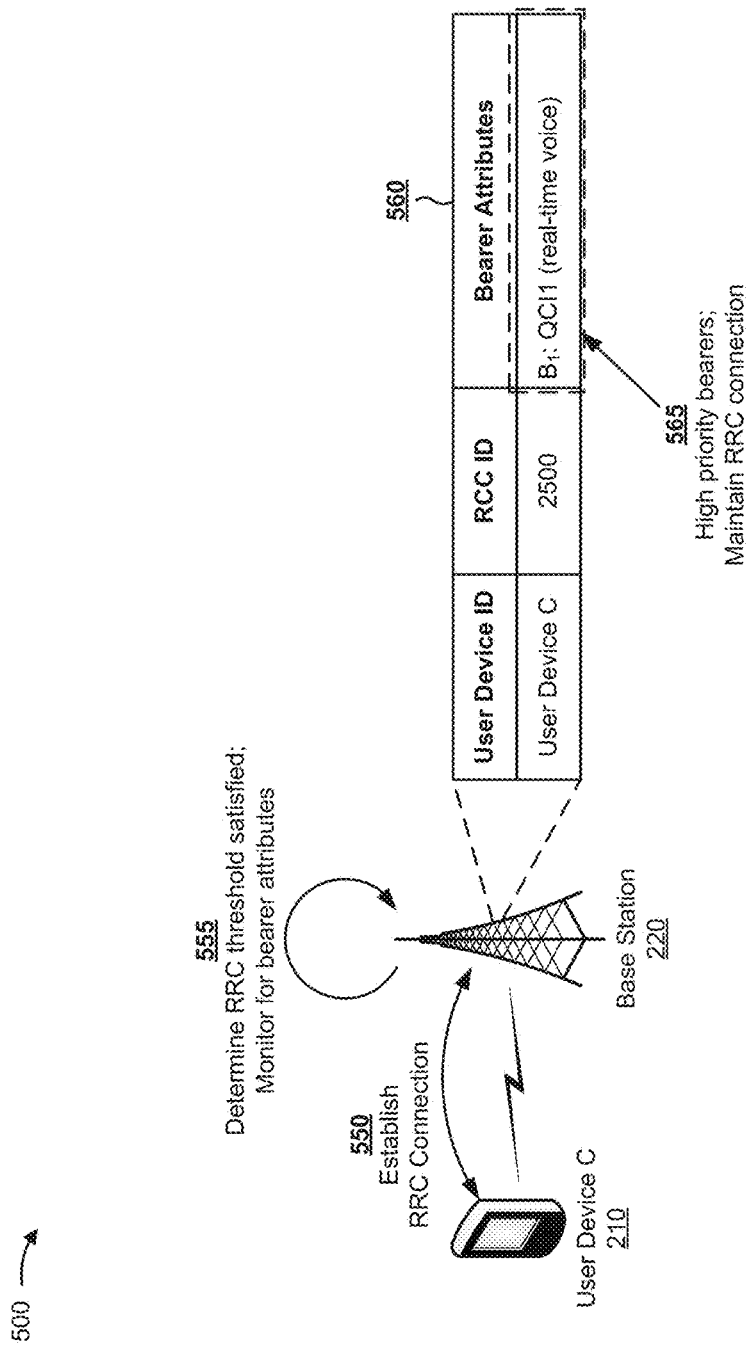

As shown in FIG. 5D, and by reference number 550, assume that at a later time, base station 220 establishes an RRC connection with a third user device 210, shown as User Device C. As shown by reference number 555, assume that base station 220 determines that the RRC connection threshold is satisfied (e.g., there are currently 2500 or more RRC connections), and determines to monitor the RRC connection with User Device C to determine bearer attributes. As shown by reference number 560, assume that User Device C is associated with one bearer ($B_1$) on the RRC connection, which carries a real-time voice communication with a QCI value of 1. As shown by reference number 565, base station 220 determines that the bearer is a high priority bearer (e.g., is associated with a real-time, guaranteed bitrate communication). Based on determining that at least one bearer associated with the RRC connection with User Device C is a high priority bearer, base station 220 maintains the RRC connection with User Device C. However, since the RRC connection threshold has been exceeded, base station 220 determines another RRC connection to terminate.

Figure 5E:
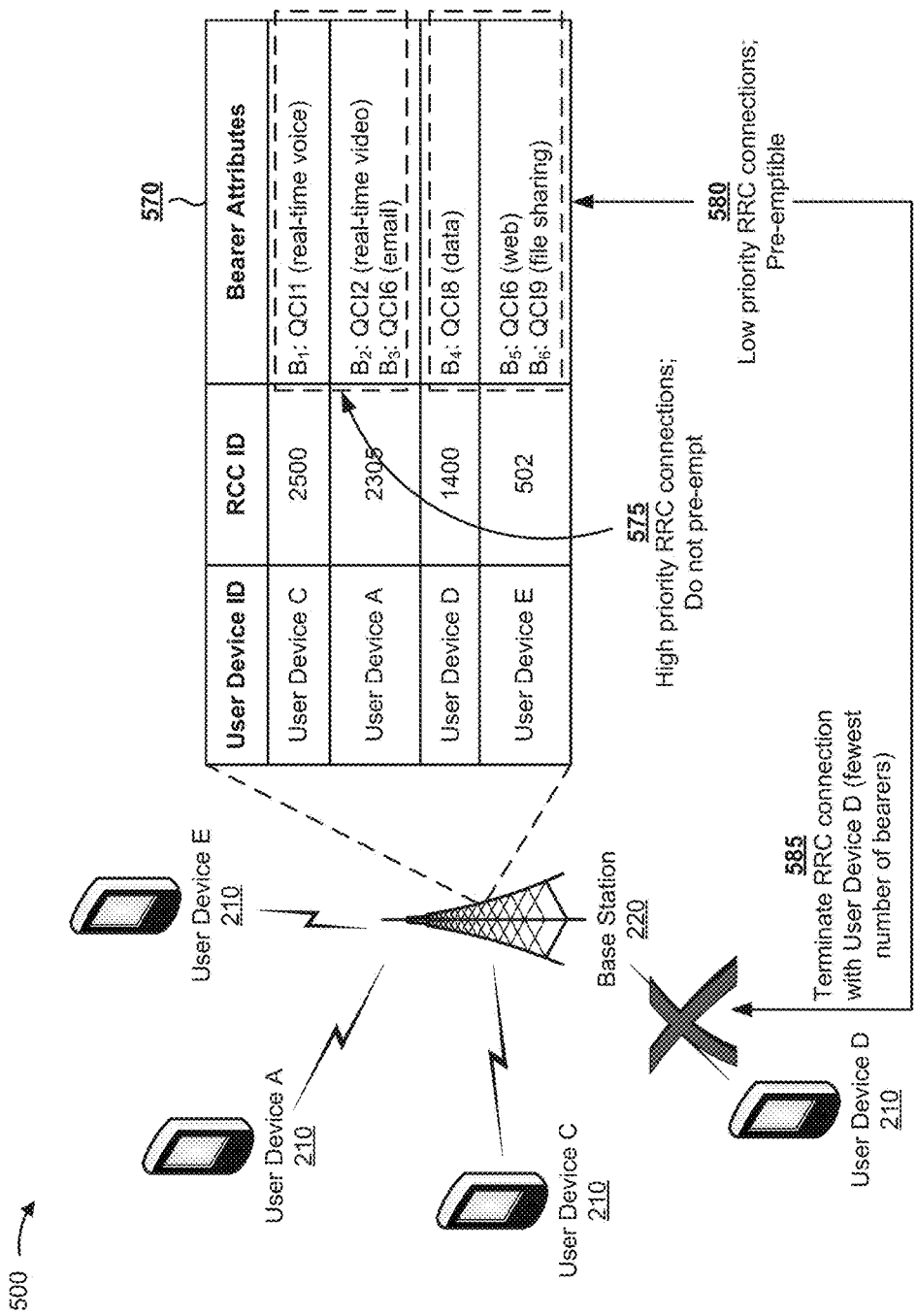

As shown in FIG. 5E, assume that four of the user devices 210 connected to base station 220, via an RRC connection, include User Device A, User Device C, User Device D, and User Device E. As shown by reference number 570, assume that base station 220 determines bearer attributes associated with an RRC connection for each of these four user devices (e.g., and other user devices 210 in communication with base station 220). Assume that User Device C is associated with one high priority bearer ($B_1$), which carries a real-time voice communication with a QCI value of 1. Assume that User Device A is associated with two bearers, one of which is a high priority bearer ($B_2$) that carries a real-time video communication with a QCI value of 2, and the other of which is a low priority bearer ($B_3$) that carries an email communication with a QCI value of 6. Assume that User Device D is associated with one low priority bearer ($B_4$), which carries a data communication with a QCI value of 8. Assume that User Device E is associated with two bearers, one of which is a low priority bearer ($B_5$) that carries a web communication with a QCI value of 6, and the other of which is a low priority bearer ($B_6$) that carries a file sharing communication with a QCI value of 9.

As shown by reference number 575, base station 220 determines that User Device A and User Device C are each associated with a high priority RRC connection (e.g., with at least one high priority bearer). Thus, base station 220 determines not to pre-empt (e.g., terminate) the RRC connections of User Device A or User Device C.

As shown by reference number 580, base station 220 determines that User Device D and User Device E are each associated with a low priority RRC connection (e.g., with no high priority bearers). As shown by reference number 585, base station 220 terminates the RRC connection of User Device D because User Device D is associated with fewer bearers (e.g., one) as compared to User Device E (e.g., which is associated with two bearers). As another example, base station 220 may determine to terminate the RRC connection of User Device E because User Device E has been connected to base station 220 longer than User Device D (e.g., User Device E is associated with the 502$^{nd}$ RRC connection, while User Device D is associated with the 1400$^{th}$ RRC connection).

As indicated above, FIGS. 5A-5E are provided merely as an example. Other examples are possible and may differ from what was described with regard to FIGS. 5A-5E.

Implementations described herein intelligently manage RRC connections based on bearer attributes, so as to manage network congestion while still honoring bearer priority levels.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A base station, comprising:
   one or more memories; and
   one or more processors, communicatively coupled to the one or more memories, to:
   establish a radio resource control (RRC) connection with a user device;
   determine a bearer attribute of a bearer associated with the RRC connection and the user device,
      the bearer attribute comprising a priority level associated with the bearer;
   determine whether the priority level satisfies a priority level threshold; and
   selectively perform a first action or a second action based on determining whether the priority level satisfies the priority level threshold,
      the first action being performed when the priority level threshold is not satisfied, and the first action including:
         terminating the RRC connection associated with the user device;
      and
      the second action being performed when the priority level threshold is satisfied, and the second action including:
         analyzing a plurality of bearer attributes associated with a plurality of established RRC connections;
         selecting, based on analyzing the plurality of bearer attributes, a terminable RRC connection associated with a different user device,
            the terminable RRC connection being different from the RRC connection; and
         terminating the terminable RRC connection based on selecting the terminable RRC connection.

2. The base station of claim 1, where the one or more processors, when performing the second action, are to:
   determine that the terminable RRC connection has been connected with the base station for a longer amount of time than another RRC connection of the plurality of established RRC connections, and
   where the one or more processors, when selecting the terminable RRC connection, are to:
   select the terminable RRC connection based on determining that the terminable RRC connection has been connected with the base station for the longer amount of time than the other RRC connection.

3. The base station of claim 1, where the one or more processors, after establishing the RRC connection, are to:
   determine a quantity of RRC connections in the plurality of RRC connections; and
   determine whether the quantity of RRC connections satisfies an RRC connection threshold.

4. The base station of claim 3, where the one or more processors, when determining the quantity of RRC connections, are to:
   detect establishment of a new RRC connection based on detecting another user device entering a service area of the base station; and
   increment a counter value based on detecting establishment of the new RRC connection.

5. The base station of claim 1, where the one or more processors, when performing the second action, are to:
   determine that a first bearer, associated with a first RRC connection of the plurality of established RRC connections, is a high priority bearer; and
   where the one or more processors, when selecting the terminable RRC connection, are to:
   maintain the first RRC connection based on the first bearer being the high priority bearer.

6. The base station of claim 5, where the one or more processors, when determining that the first bearer is the high priority bearer, are to:

determine that the first bearer is the high priority bearer
based on the first bearer being associated with at least
one of:
a real-time communication,
a guaranteed bitrate communication,
a non-pre-emptible communication,
a high priority level, or
a high priority score.

7. The base station of claim 1, where the one or more processors, when performing the second action, are to:
terminate the terminable RRC connection by preventing information from being at least one of provided to or received from a particular user device associated with the terminable RRC connection.

8. A non-transitory computer-readable medium storing instructions, the instructions comprising:
one or more instructions that, when executed by one or more processors of a base station, cause the one or more processors to:
establish a radio resource control (RRC) connection with a user device;
determine a bearer attribute of a bearer associated with the RRC connection and the user device,
the bearer attribute comprising a priority level associated with the bearer, determine whether the priority level satisfies a priority level threshold; and
selectively perform a first action or a second action based on determining whether the priority level satisfies the priority level threshold,
the first action being performed when the priority level threshold is not satisfied, and the first action including:
terminating the RRC connection associated with the user device;
and
the second action being performed when the priority level threshold is satisfied, and the second action including:
analyzing a plurality of bearer attributes associated with a plurality of established RRC connections;
selecting, based on analyzing the plurality of bearer attributes, a terminable RRC connection associated with a different user device, the terminable RRC connection being different from the RRC connection; and
terminating the terminable RRC connection based on selecting the terminable RRC connection.

9. The non-transitory computer-readable medium of claim 8, where the one or more instructions, that cause the one or more processors to perform the second action, are to:
determine that the terminable RRC connection has been connected with the base station for a longer amount of time than another RRC connection of the plurality of established RRC connections, and
where the one or more instructions, that cause the one or more processors to select the terminable RRC connection, are to:
select the terminable RRC connection based on determining that the terminable RRC connection has been connected with the base station for the longer amount of time than the other RRC connection.

10. The non-transitory computer-readable medium of claim 8, where the one or more instructions, after causing the one or more processors to establish the RRC connection, are to:
determine a quantity of RRC connections in the plurality of RRC connections; and
determine whether the quantity of RRC connections satisfies an RRC connection threshold.

11. The non-transitory computer-readable medium of claim 10, where the one or more instructions, that cause the one or more processors to determine the quantity of RRC connections, are to:
detect establishment of a new RRC connection based on detecting another user device entering a service area of the base station; and
increment a counter value based on detecting establishment of the new RRC connection.

12. The non-transitory computer-readable medium of claim 8, where the one or more instructions, that cause the one or more processors to perform the second action, are to:
determine that a first bearer, associated with a first RRC connection of the plurality of established RRC connections, is a high priority bearer; and
where the one or more instructions, that cause the one or more processors to select the terminable RRC connection, are to:
maintain the first RRC connection based on the first bearer being the high priority bearer.

13. The non-transitory computer-readable medium of claim 12, where the one or more instructions, that cause the one or more processors to determine that the first bearer is the high priority bearer, are to:
determine that the first bearer is the high priority bearer based on the first bearer being associated with at least one of:
a real-time communication,
a guaranteed bitrate communication,
a non-pre-emptible communication,
a high priority level, or
a high priority score.

14. The non-transitory computer-readable medium of claim 8, where the one or more instructions, that cause the one or more processors to perform the second action, are to:
terminate the terminable RRC connection by preventing information from being at least one of provided to or received from a particular user device associated with the terminable RRC connection.

15. A method, comprising:
establishing, by a base station, a radio resource control (RRC) connection with a user device;
determining, by the base station, a bearer attribute of a bearer associated with the RRC connection and the user device,
the bearer attribute comprising a priority level associated with the bearer;
determining, by the base station, whether the priority level satisfies a priority level threshold; and
selectively performing, by the base station, a first action or a second action based on determining whether the priority level satisfies the priority level threshold,
the first action being performed when the priority level threshold is not satisfied, and the first action including:
terminating, by the base station, the RRC connection associated with the user device; and
the second action being performed when the priority level threshold is satisfied, and the second action including:
analyzing, by the base station, a plurality of bearer attributes associated with a plurality of established RRC connections;

selecting, by the base station and based on analyzing the plurality of bearer attributes, a terminable RRC connection associated with a different user device, the terminable RRC connection being different from the RRC connection; and terminating, by the base station, the terminable RRC connection based on selecting the terminable RRC connection.

16. The method of claim 15, where performing the second action comprises:

determining that the terminable RRC connection has been connected with the base station for a longer amount of time than another RRC connection of the plurality of established RRC connections, and where selecting the terminable RRC connection comprises:

selecting the terminable RRC connection based on determining that the terminable RRC connection has been connected with the base station for the longer amount of time than the other RRC connection.

17. The method of claim 15, where, after establishing the RRC connection, the method comprises:

determining a quantity of RRC connections in the plurality of RRC connections; and determining whether the quantity of RRC connections satisfies an RRC connection threshold.

18. The method of claim 17, where determining the quantity of RRC connections comprises:

detecting establishment of a new RRC connection based on detecting another user device entering a service area of the base station; and incrementing a counter value based on detecting establishment of the new RRC connection.

19. The method of claim 15, where performing the second action comprises:

determining that a first bearer, associated with a first RRC connection of the plurality of established RRC connections, is a high priority bearer; and where selecting the terminable RRC connection comprises:

maintaining the first RRC connection based on the first bearer being the high priority bearer.

20. The method of claim 15, where performing the second action comprises:

terminating the terminable RRC connection by preventing information from being at least one of provided to or received from a particular user device associated with the terminable RRC connection.

* * * * *